Jan. 14, 1936.  W. H. MEANS  2,027,487
BRAKE
Filed Nov. 23, 1933  2 Sheets-Sheet 2
FIGURE 8.
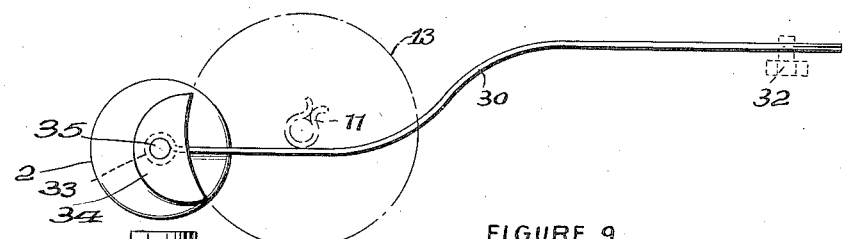
FIGURE 9.
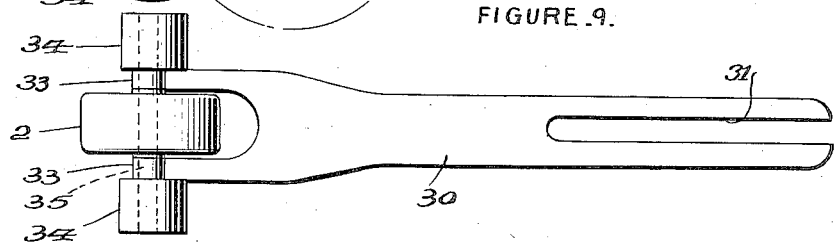
FIGURE 10.  FIGURE 11.  FIGURE 12.
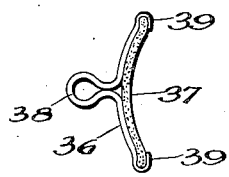 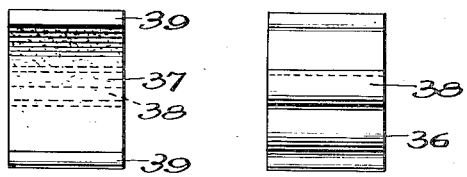
FIGURE 13.  FIGURE 14.
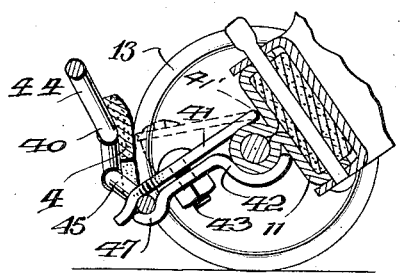 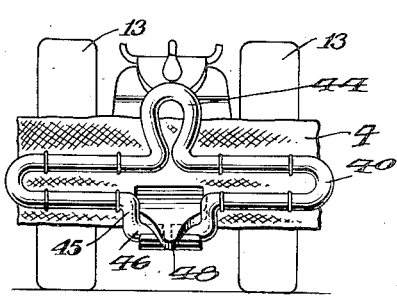
Inventor
Walter H. Means,
By Chas. M. Funkhouser
Attorney Patented Jan. 14, 1936

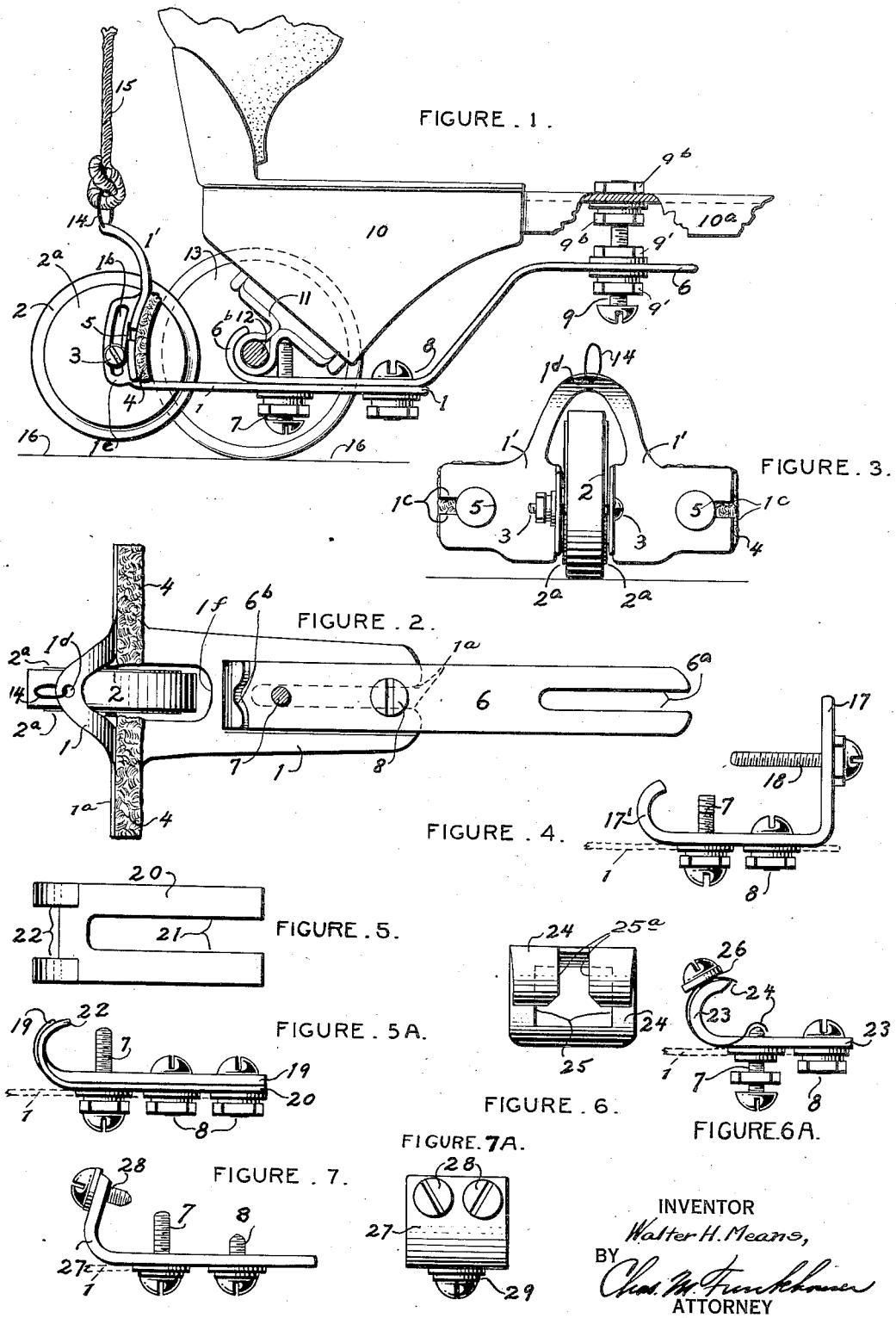

2,027,487

UNITED STATES PATENT OFFICE 2,027,487

BRAKE

Walter H. Means, Atlanta, Ga.

Application November 23, 1933, Serial No. 699,419

11 Claims. (Cl. 208—173)

My invention relates to brakes and more particularly to improvements in brakes for roller skates, skooters and the like.

One important object of the present invention is to provide a novel form of brake attachment for roller skates which shall have universal application to the wide variety of roller skate construction now on the market.

Another object of the invention is to provide a brake mechanism of the character described which shall be controlled either automatically by manipulating the skate or manually, at the option of the operator.

Another object of the invention is to provide a novel clamp support for the brake mechanism.

Another object of the invention is to provide a novel form of brake adjusting mechanism.

A further object of the invention is to provide a novel form of roller skate brake which shall be simple and durable in construction, convenient in assembly to skates and more reliable in operation and adjustment than similar devices heretofore proposed.

These and other objects of the invention will be more manifest from the following specification and drawings and more particularly set forth in the claims.

In the drawings:

Figure 1 is a fragmentary view in elevation of a roller skate employing a brake mechanism embodying my invention, Figure 2 is a top plan view of the brake attachment shown in Figure 1, Figure 3 is a rear view of the attachment shown in Figure 2, Figure 4 is a view in elevation showing a modification of an axle clamp for mounting the brake attachment to a skate axle frame, Figure 5 is a top plan view of a yieldable clamp plate for attaching the brake support to a skate.

Figure 5a is a view in elevation of a clamp assembly embodying the plate shown in Figure 5, Figure 6 is an end view showing a modification of a yieldable clamp construction employed, Figure 6a is a view in elevation of a clamp assembly shown in Figure 6, Figure 7 is a view in elevation of a modification of a clamp structure, Figure 7a is an end view of the clamp shown in Figure 7, Figure 8 is a view in elevation of a modification of the brake attachment shown in Figure 1, Figure 9 is a top plan view of the device shown in Figure 8, Figure 10 is a sectional view of a novel form of brake shoe, Figure 11 is a front view of the device shown in Figure 10, Figure 12 is a rear view of the device shown in Figure 10, Figure 13 is a sectional view of a modification of the brake device yieldably clamped to a skate axle; and Figure 14 is an end view of the device shown in Figure 13.

Referring to the drawings, there is shown in Figures 1, 2 and 3 a brake mechanism embodying my invention and applied to the double rear wheels of a conventional type of roller skate. While I have shown the brake attached to a double wheeled roller skate, it is obvious that a brake constructed and arranged in accordance with my invention may also be applied with equal facility to other types of skates or skooters as well understood in this art.

A brake mechanism embodying my invention comprises essentially a brake frame or support 1 of yieldable flat metal which may be attached to a skate frame 10—10a as well as the rear skate wheel axle frame 11 enclosing an axle 12. This brake support may be made of suitable spring metal or stiff metal provided with yieldable adjustments which shall facilitate the desired operation of the brake on the skate wheels, one of which is indicated by numeral 13.

The rear portion of the support 1 is provided with an upward extension 1' adapted to retain a pair of brake elements 4—4 for each wheel and which may be of the ordinary and well known brake lining material. The extension 1' is also formed to support a ground or cam wheel 2 for engaging the ground and flexing the brake support 1 when it is desired to apply the brakes by elevating the front of the skate and effect a desired braking action on the skate wheel as hereinafter more fully described. This extension is also provided with a vertical angular projection 1e having a vertical slot 1b adapted to accommodate the ground wheel axle 3 and permit vertical adjustment thereof relative to the ground surface indicated by the numeral 16. The brake lining is secured to the brake support by any suitable fastening means such as rivets indicated by the numeral 5.

One of the important features of the invention is the novel manner of mounting the yieldable brake support so as to effect the desired braking action and at the same time permit its adaptation to the wide variety of skate constructions now on the market. The brake support 1 is connected to the axle housing 11 by means of an extension member 6 having a curved central portion 6' and substantially parallel end portions. The forward end of member 6 is slotted as shown at 6a to receive a threaded adjustable bolt member 9 and the rear portion is provided with a hook portion 6b for engaging the axle frame 11. The forward portion is rigidly secured to the skate shoe plate 10 by means of the bolt 9 and the threaded lock nuts 9'—9'. The bolt 9 is also adjustably secured to the skate frame by lock nuts 9b—9b.

The rear portion of the extension member 6 is secured to the axle housing 11 by the cooperation of the hook portion 6b and an adjustable bolt 7 threaded through the member 6 and adapted to engage the axle housing 11. The brake frame or support 1 and the associated extension member 6 are also clamped in adjustable relation by this bolt 7 and a forward bolt 8. These two clamping bolts also work in a slot 1a provided in the frame 1 as shown in Figure 2 and thereby provide a wide range of adjustments for the application of my improved brake device to different specific skate constructions.

The ground wheel is also provided with dust shields 2a—2a and the upper portion of the extension 1' is provided with a suitable extension 1b adapted to receive an operating link 14 and cord 15. This extension may also be in the form of a lever member adapted to be operated by a stick or foot pressure applied thereto in a manner well understood in the operation of similar brake devices.

Having thus described one embodiment of my novel roller skate brake mechanism, the operation thereof is carried out in the following manner. The brake may be applied by raising the toe of the skate and thus cause the ground wheel 2 to engage the ground and flex the rear portion of the support 1 to bring the brake elements into contact with the wheels 13—13. Further excessive pressure is compensated for by the elongation of the curved central portion of the support when the support tends to move about the skate axle as is evident from its position to one side thereof. The brake may also be applied by pulling the cord 15 to flex the brake support in a similar manner.

Another important feature of my invention is the provision of a brake device which shall have universal application to skate structures, and Figure 4 shows a modified form of clamp for a particular type of rear skate axle mounting. In this construction a substantially right angle iron brace is provided with a hook portion 17' for engaging the skate axle housing 11, and a straight vertical portion 17 carrying a threaded adjusting bolt 18 for engaging another portion of the housing or associated skate frame part. This clamp also includes the adjusting and securing bolts 7 and 8 for mounting the brake frame 1 indicated in dotted lines and heretofore described with reference to Figure 1.

In Figures 5 and 5a, still another type of universal adjusting clamp is shown in which one end of a flat body 19 is provided with a hooked portion 19' and this body is provided with a complementary body portion 20 provided with a slot 21 and spaced hooked end portions 22—22 adapted to straddle the hook 19' as shown in Figure 5a.

In Figures 6 and 6a, there is shown another form of brake support clamp in which a clamp body 23 is provided with a complementary clamp metal shell member 24 including an aperture 25 through which the hook portion is received when the parts are assembled. A slotted portion 25a is also provided in the shell for permitting circumferential adjustment of the member 24 by a set nut 26. In this construction it will be obvious that as the bolt 7 is advanced the shell member 24 will be closed and thus positively grip any axle member to which it may be applied.

Figures 7 and 7a illustrate still another type of adjustable clamp which may be necessary to secure the brake support 1 to a skate axle. In this modification, the ends of the metal support are bent at an acute angle so that an adjusting nut 28 and associated nut 7 shall grip and positively clamp the axle housing 11 and the associated support 1, both indicated in dotted lines, in a rigid relation.

Referring to the modified form of brake support shown in Figures 8 and 9, this support is in the form of a single unit 30 of yieldable stamped flat metal. The central portion of this member is curved vertically and the end portions are substantially parallel as shown in Figure 1 heretofore described. The forward portion is slotted as indicated by the numeral 31 so that it may be adjusted to different skate lengths and rigidly secured to the skate frame by bolt member indicated by the numeral 32. The rear portion of support 30 is forked and each portion is provided with bearing members 33—33 for rotatably supporting the ground wheel 2 and a pair of brake shoe elements 34—34. The brake shoes are also mounted on an extension of the axle of wheel 2 and indicated by the numeral 35.

One important feature of this construction is that the brake support is yieldably maintained in contact with the axle housing 11 by means of the single securing device 32 at the forward portion of the unit. The brake is applied as in the previous construction by merely raising the toe of the skate to bring the ground wheel into contact with the ground and thus flex the support. The support being extensible due to the curved central portion, any excessive gripping action is prevented and the brakes are applied by a predetermined pressure which may be obtained from the primary adjustments.

In Figures 10, 11 and 12 there is shown an improved pressed metal brake shoe 36 enclosing and mounting a suitable lining 37. In this construction the metal body is formed to provide an axle support 38 and clamping edge members 39—39 for securing the brake lining 37 thereto.

In the modification shown in Figures 13 and 14, a transverse brake support member 40 is pivotally mounted upon a novel form of axle clamp comprising members 41 and 42 secured by a bolt 43. In this construction the support 40 is made of heavy steel wire and is bent to provide an upwardly and rearwardly extending loop portion 44 which may serve as a lever for operating the brake. A downwardly and inwardly extending open loop portion 45 formed by the free meeting ends of the support forms a pivotal connection 46 with the extremity of the clamp members 41—42. The lower outer end of member 42 is provided with a cup-shaped portion 47 to receive frame loop portion 45. The complementary end of clamp member 41 is wedge-shaped as indicated by the numeral 48 so as to provide a cam surface which shall cause the loop portion 46 to yield when the brake support 40 is actuated by lever 44. This yieldable action effects an automatic release of the brake member from engagement with the skate wheels.

One feature of this proposed construction is that when excess pressure is brought upon the brake lever 44 the end of clamp plate 41 engaging the axle housing 11 moves as indicated in dotted lines and thereby cams the end of lower yieldable plate member 42 away from the housing. The outward movement of the brake support 40 will be obvious as it then pivots about the point 41' which is eccentric to the skate wheel axis. This small outward movement due to the flexing of the brake support is of fundamental importance in automatically regulating the braking pressure applied to the skate wheels and therefore minimizing any tendency to lock the wheels. From the foregoing it will be noted that when the pressure on the lever 44 is released, the clamp members return to their normal clamping relation and the cam surfaces return the brake member 40 to a normal position out of engagement with the skate wheel.

In the construction shown in Figure 8, the brake support 30 is rigidly secured to the skate frame 10 by the bolt 32 and the rear portion is yieldably held in engagement with the axle housing 11. The brake pressure is applied by slightly raising the toe of the skate and causing the wheel 2 to engage the ground and thus flex the support 30 around the axle housing 11 as a pivot in a similar manner as heretofore described. When the toe is lowered the resilient action of the support 30 returns the parts to their normal position and thus permits free and unobstructed movement of the skate.

Whichever form of the brake is employed, one of the primary features of the present invention is the provision of a brake support mechanism which may be readily adjusted to meet the various operating conditions to which it may be subjected.

Having thus described several embodiments of a roller skate brake constructed and arranged in accordance with my invention, it is obvious that various modifications may be made therein without departing from the scope of the invention as defined in the appended claims.

Having thus fully described my said invention, what I claim and desire to secure by Letters Patent is:

1. In a brake mechanism for roller skates, a yieldable longitudinally extensible brake support having a brake member carried by the rear portion of the support, means for rigidly securing the forward portion of the brake support to a skate frame, means for flexing the rear portion of the brake support to apply said brake member to a wheel, and means for angularly adjusting the rear portion of the brake member relative to the rotational axis of the skate wheel.

2. In a brake mechanism for roller skates, a yieldable longitudinally extensible brake support having a brake member carried by the rear portion of the support, means for rigidly securing the forward portion of the brake support to a skate frame, means for flexing the rear portion of the brake support to apply said brake member to a wheel, and means for longitudinally adjusting the brake support relative to the skate frame and the periphery of a skate wheel.

3. In a brake mechanism for roller skates, a yieldable longitudinally extending brake support having a curved central portion and substantially parallel front and rear end portions, a brake member carried by the rear portion of the support, means for rigidly securing the forward portion of the brake support to a skate frame, and a ground contact wheel journaled in the rear portion of said brake support for flexing said support to apply the brake members to a skate wheel.

4. In a brake mechanism for roller skates, a yieldable longitudinally extending brake support having a curved central portion and substantially parallel front and rear end portions, a brake member carried by the rear portion of the support, means for rigidly securing the forward portion of the brake support to a skate frame, a ground contact wheel journaled in the rear portion of said brake support for flexing said support to apply the brake members to a skate wheel, and means for vertically adjusting the ground wheel relative to the brake support whereby the tilting movement of the skate body is varied about the axis of rotation of a skate wheel to effect the desired braking action on said wheel.

5. The combination with the rear double wheels and axle frame of a roller skate, of a brake mechanism therefor comprising, a yieldable brake support extending between said rear wheels, brake members mounted on the support and adapted to engage each periphery of the wheel, means for mounting the brake support to the axle frame including a clamp, and means for adjusting the clamping means whereby the brake members may be adjusted relative to the wheels.

6. The combination with the rear double wheels and axle frame of a roller skate, of a brake mechanism therefor comprising a brake support of yieldable material extending between the rear wheels, means on the axle frame for mounting said support, and yieldable means included in said brake support for engaging said mounting means to automatically effect a releasing movement of said brake.

7. In a brake mechanism for roller skates, a yieldable longitudinally extending brake support having a curved central portion and substantially parallel front and rear end portions, a brake member carried by the rear portion of the support, means for rigidly securing the forward portion of the brake support to a skate frame, and means for rearwardly flexing the brake support whereby any positive locking action of the brake member on the wheels is reduced to a minimum.

8. A brake attachment for roller skates comprising, a yieldable brake support, means for attaching the support to one side of a skate axle and between the wheels carried thereby, brake members carried by the rear portion of said support, and means at the rear portion of said support for flexing the support to apply the brake members and to regulate the application of pressure to said brakes.

9. A brake mechanism of the character designated in claim 8 including means to clamp the brake support to a skate axle, and means for compensating for excessive braking pressures.

10. A brake attachment for roller skates comprising, a yieldable brake support, means for attaching the support to the axle of a roller skate so that it shall extend between the wheels carried thereby, means for flexing the support to apply a brake member carried thereby, and means included in said support to compensate for excessive pressures applied thereto.

11. In a brake mechanism for the double rear wheels of a roller skate, a yieldable brake support extending between the wheels, brake members carried by said support, a ground contact wheel located between the brake members for flexing the rear portion of the support to apply the brake members to the skate wheels, and a shaft for mounting said contact wheel and brake members on the support.

WALTER H. MEANS.